Nov. 8, 1927.  
O. M. TURNER ET AL  
1,648,204  
SLEEVE PUMP VALVE  
Filed Sept. 2, 1926
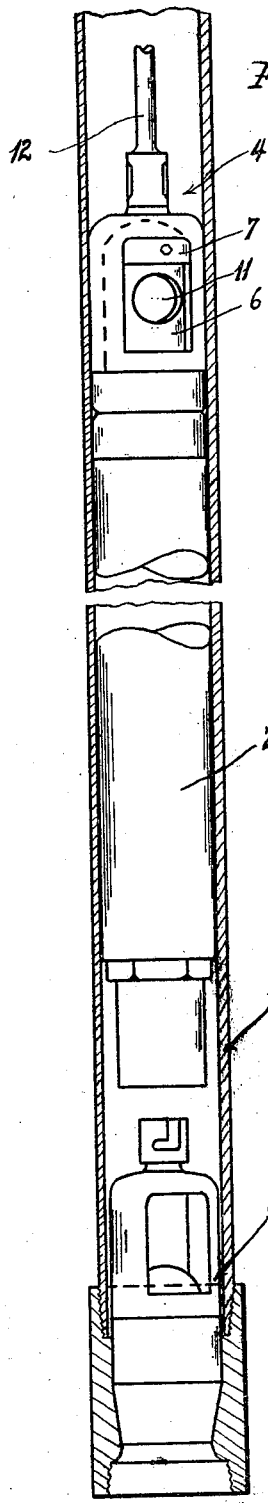
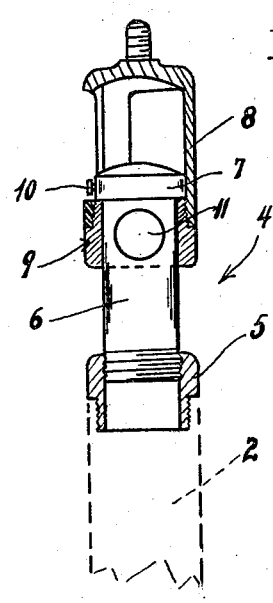
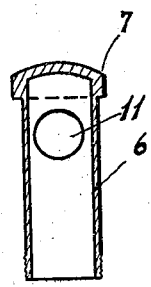
INVENTORS.  
ORVAL M. TURNER.  
HARVEY W. CANNON.  
BY  
ATTORNEY.

Patented Nov. 8, 1927.

1,648,204

UNITED STATES PATENT OFFICE.

ORVAL M. TURNER AND HARVEY W. CANNON, OF LONG BEACH, CALIFORNIA.

SLEEVE PUMP VALVE.

Application filed September 2, 1926. Serial No. 133,138.

It has been the practice heretofore to provide valves on the plunger of an oil well pump which valves consisted of a cage and ball seated therein. Due to sand, gas pressure, etcetera, the ball would very often not seat resulting in the loss of a portion of the fluid in the pump.

An object of our invention is to provide a valve for a deep well pump which will dispense with the ball.

Another object is to provide a valve which will positively open and close on each stroke of the pump.

A still further object is to provide a valve of the character stated which may be readily applied to the well-known types of pumps or swabs now in common use without in any way changing the structure thereof.

Still another object is to provide a sleeve valve which is simple in construction, inexpensive to manufacture and effective in operation.

Other objects, advantages and features of our invention may appear from the accompanying drawing, the subjoined detailed description, the appended claims, or in the operation of the valve.

In the drawing:

Fig. 1 is a longitudinal sectional view of a pump with our valve positioned thereon.

Fig. 2 is a longitudinal sectional view of our valve.

Fig. 3 is a longitudinal sectional view of the sleeve.

Referring more particularly to the drawing:

The numeral 1 indicates the usual pump barrel and 2 indicates the reciprocating plunger therein. The usual standing valve 3 is mounted in the lower end of the pump and a top valve 4 is secured to the top of the plunger 2. A hollow nut 5 is threaded into the top of the plunger 2 and a hollow sleeve 6 screws into the nut 5. While we have described one method of securing the sleeve 6 to the plunger it is obvious that other means may be employed without departing from the spirit of our invention.

The hollow sleeve 6 has a head 7 formed on the upper end thereof, said head closing the top of the sleeve. The usual valve cage 8 is provided into which the sleeve 6 extends, the head 7 thereof, being guided by the sides of the cage. A guide nut 9 is threaded into the lower end of the cage 8 and the sleeve 6 accurately fits the bore of the said nut, or the sleeve and nut may be tapered to accurately fit when the cage 8 is raised. To prevent rotation of the sleeve 6 in the cage 8 a set screw 10 projects from the side of the head 7, said screw extending into the slots in the cage. Any other suitable guide may also be employed if desired.

Outlet ports 11 are formed in the sleeve 6 below the head 7 to permit the fluid to pass therethrough. The usual sucker rods 12 are secured to the top of the cage 8 in the usual manner.

In operation on the up stroke of the plunger 2 the head 7 of the sleeve 6 is urged against the nut 9 by the weight of the fluid in the barrel and by the frictional engagement of said barrel against the walls of the pump. Thus the ports 11 are positioned in the nut 9 and are closed by said nut. On the down stroke of the plunger 2 the cage 8 and nut 9 will slide downwardly over the sleeve 6 until the nut 9 engages the nut 5. Thus opening the ports 11 to permit egress of the fluid therethrough. Thus it will be seen that on the up stroke of the plunger the top valve is positively closed and on the down stroke is positively open insuring the proper operation of the plunger.

Having described our invention, we claim:

1. The combination with a pump, comprising a reciprocating plunger, of a sleeve having ports therein, means securing said sleeve to the plunger, sucker rod coupling means slidably mounted on said sleeve, said coupling means being adapted to slide over and close the ports on the up stroke of the pump and open said ports on the down stroke.

2. The combination with a pump, comprising a reciprocating plunger, of a valve on said plunger, a sleeve in said valve having ports therein, and means adapted to close said ports on the up stroke of the pump and open the ports on the down stroke.

3. The combination with a pump, comprising a reciprocating plunger, of a sleeve having ports therein, said sleeve being secured to the plunger, a cage in which the sleeve is slidably mounted and to which the sucker rods are secured, said cage being adapted and arranged to close the ports in the lowered position of the sleeve and to expose the ports in the raised position.

4. The combination with a pump, comprising a reciprocating plunger, of a sleeve having ports therein, a nut threaded on to said sleeve and the plunger, a cage, a guide nut threaded into said cage, said sleeve being slidably journaled in the guide nut, said guide nut being adapted and arranged to cover the ports in the lowered position of the sleeve and to expose the ports in the raised position, and a head on said sleeve.

In testimony whereof, we affix our signatures.

ORVAL M. TURNER.
HARVEY W. CANNON.